United States Patent [19]

Sandler et al.

[11] Patent Number: 5,983,117
[45] Date of Patent: Nov. 9, 1999

[54] SYSTEM AND METHOD FOR INTERFACING A STANDARD TELEPHONY DEVICE TO A WIRELESS COMMUNICATION SYSTEM

[75] Inventors: Howard Martin Sandler; Mahshad Koohgoli, both of Ottawa, Canada; Jerry J. Parker, Richardson, Tex.

[73] Assignee: Nortel Networks Corporation, Montreal, Canada

[21] Appl. No.: 08/667,569

[22] Filed: Jun. 21, 1996

[51] Int. Cl.$^6$ ...................................................... H04Q 7/20
[52] U.S. Cl. ........................... 455/557; 455/74.1; 455/445
[58] Field of Search ................................. 455/4–12, 557, 455/452, 426, 457, 461, 445, 435, 74.1

[56] References Cited

U.S. PATENT DOCUMENTS

| | | | |
|---|---|---|---|
| 4,658,096 | 4/1987 | West, Jr. et al. | 379/59 |
| 4,718,080 | 1/1988 | Serrano et al. | 379/59 |
| 4,737,975 | 4/1988 | Shafer | 379/58 |
| 4,775,997 | 10/1988 | West, Jr. et al. | 379/58 |
| 4,837,800 | 6/1989 | Freeburg et al. | 455/557 |
| 4,959,851 | 9/1990 | Tobolski, Jr. et al. | 455/557 |
| 5,117,450 | 5/1992 | Jogiekar et al. | 379/58 |
| 5,375,122 | 12/1994 | Soupirot et al. | 370/95.1 |
| 5,422,945 | 6/1995 | Wyatt | 379/283 |
| 5,483,576 | 1/1996 | Staples | 379/58 |
| 5,511,111 | 4/1996 | Serbetcioglu et al. | 455/412 |
| 5,659,597 | 8/1997 | Bareis et al. | 455/560 |
| 5,724,656 | 3/1998 | Vo et al. | 455/557 |
| 5,781,612 | 3/1995 | Choi et al. | 455/557 |
| 5,884,148 | 7/1976 | Bilzic | 455/74.1 |

FOREIGN PATENT DOCUMENTS

WO 95/24103 9/1995 WIPO.
WO 96/13948 5/1996 WIPO.
WO 97/13381 4/1997 WIPO.
WO 97/20445 6/1997 WIPO.

OTHER PUBLICATIONS

Hagen J.W., "A VHF radio system for providing telephone subscriber service in difficult access rural areas", 1076 International Conference on Communications, Philadelphia, PA, USA, Jun. 14–16 1976, vol. 2 pp. 27/27–32XP 002049265.

*Primary Examiner*—Edward F. Urban
*Assistant Examiner*—Tilahun Gesesse
*Attorney, Agent, or Firm*—Jeffrey M. Measures; John D. Crane

[57] ABSTRACT

A system for providing fixed wireless access to standard telephony device is disclosed. A subscriber unit comprising a telephony interface for connecting to a standard telephony device, and a transceiver for establishing a communication link with a wireless network is used for providing telephony service to standard telephony device. Dual tone multiple frequency (DTMF) tones produced by said standard telephony device are sent to the wireless network, either directly or indirectly in the form of digit messages corresponding to the dialed digits, after a call set up message is sent. The subscriber unit sends a special set up message which identifies the subscriber unit as a terminal which sends digits on a digit by digit basis. A wireless network component (e.g. an MSC) is configured to identify such a set up message and upon receiving such a set up message collects and analyses digits sent by a subscriber unit on a digit by digit basis in order to provide a service feature or to connect a call.

28 Claims, 8 Drawing Sheets

SYSTEM AND METHOD FOR INTERFACING A STANDARD TELEPHONY DEVICE TO A WIRELESS COMMUNICATION SYSTEM

FIELD OF THE INVENTION

This invention relates to radio communication systems in which standard (e.g. wireline) telephony devices are interfaced to radio transceivers which communicate with a wireless telephone network.

BACKGROUND TO THE INVENTION

The use of radio communication systems to provide telephony service has been seen to provide several advantages over conventional wireline networks. These advantages include speed of deployment, lower cost of installation, and reduced maintenance of outside plant. In a fixed wireless access system, base stations, which include a radio transceiver and which communicate with a telephone network, are placed at intervals within a neighborhood so as to be within range of subscriber units. A subscriber unit (SU) is a user device which contains a radio transceiver for communicating to a base station.

In many cases, the radio system used as the basis for a fixed wireless access system is one originally designed for mobile cellular telephony. In cellular-type systems, there is a network element, known as a mobile telephone switching office or a mobile switching center (MSC), which acts as an interface between the radio equipment and the telephone network (PSTN). The MSC performs many functions, including the receipt of dialed directory numbers, analysis of dialed directory numbers, activation of services or routing of calls to voice/data facilities, e.g. trunk or line facilities, and billing.

When a subscriber originates the call using a conventional mobile cellular subscriber terminal, the digits entered by the user are collected and stored locally in the terminal until the user presses a "SEND" key to indicate that the entire set of digits has been entered. At that point, a radio signaling link to a base station is used to transmit the entire set of entered digits in a message to the base station. The base station then transmits the entered digits, typically a directory number, to the MSC. The MSC receives the set of dialed digits representing a directory number entered by the subscriber as a group. Alternatively, the user may not be originating a call, but rather, may be requesting a feature or service (e.g. call forwarding), in which case, the digits received by the MSC would be a feature activation code. Upon translating these digits, the MSC determines whether a voice/data facility is required, selects the voice/data facility, takes the necessary steps to set up a call on the outgoing facility and connects the subscriber's voice/data facility to the outgoing facility. Typically, the MSC uses the dialed digits, the corresponding directory number and other information related to the subscriber for such purposes as billing the subscriber for the call.

Due to the cost differential in producing mobile cellular terminals as compared to conventional telephones, and due to the fact that a fixed wireless access terminal does not require mobility, it has been proposed to utilize conventional telephones attached, by means of a suitable interface, to a cellular transceiver as the subscriber unit (SU). However, when there is a fixed access SU controlled by a wireline telephone set, a problem arises: there is no "SEND" key on a wireline telephone set to indicate explicitly the end of dialing; i.e. when an entire valid called-party directory number or when an activation code requesting a particular service or feature (hereinafter referred to as a feature activation code) has been entered.

One solution to this problem was disclosed in U.S. Pat. No. 4,658,096 by West, Jr. et al. This patent teaches the use of a SU which provides standard wireline telephony signaling to the telephone set, such as ringing voltage, and supplies direct current for the telephone loop. The SU also contains means for detecting digits dialed or entered by the user on the telephone, which are produced by the telephone in the formats used in analog telephony (loop disconnect (sometimes called dial pulse) or dual-tone multi-frequency (DTMF) signaling), and means for converting the detected digits into digital representations of these digits which are used in the cellular telephony system. These digits are then stored in a conventional cellular radio transceiver. This system includes a means for determining when the last digit of a valid called-party directory number had been dialed, at which point the entire called-party directory number is sent by the radio transceiver to the base station. The means for determining when the last digit had been entered involved a combination of analysis of what digits had been dialed and the number of digits entered. Essentially, knowledge of the North American dialing plan was built into the SU in order for the SU to determine when a complete valid directory number had been entered. In the system of West, Jr. et al, during the time period in which the calling subscriber had placed the telephone off-hook, but had not yet entered any digits, a radio link to a base station did not exist. In order to emulate the user interface of a conventional wireline telephone network, the interface locally produced a dial tone which the subscriber would hear in the telephone set's receiver.

A disadvantage of this solution is that the SU requires extensive electronic circuit hardware or alternatively, microcontroller memory, to perform the digit analysis. This can increase the cost and size of the SU. Also this complicates manufacture, as these units will not be easily mass produced for export, as SUs will need to be configured to suit the dialing plan for each country the units are sold in. In addition, if there are changes to the dialing plan of the territory where the system is deployed, then the SUs already deployed may not be able to originate calls properly, and may have to be withdrawn from service.

Accordingly, there is a need for collecting dialed digits in a fixed wireless access system which does not require building into the SU the knowledge of the dialing plan of the PSTN in the territory of deployment.

SUMMARY OF THE INVENTION

It is therefore an object of the present invention to provide a system for interfacing a standard telephony device to a wireless network wherein circuitry or software is not required locally within the SU for analyzing the dialed digits to determine whether a valid directory number or feature activation code has been entered or when the last digit of such a number or code has been entered.

It should be noted that other devices intended for connection to a conventional telephone line, such as facsimile machines and voiceband data modems, may also be connected to an SU. The term standard telephony device in this specification includes any of these equivalent devices, as well as a conventional telephone set.

One aspect of the invention is directed to providing telecommunication services to remote terminals which originate calls using either a first format or a second format, wherein for said first format, a remote terminal sends a set up message which includes a complete directory number or feature activation code to said wireless network, and for said second format a remote terminal sends a routing message which indicates that the terminal is using said second format and then sends digit messages representing a directory number or service feature request on a digit by digit basis to said wireless network. For example, this aspect allows for the provision of fixed wireless access services in coexistence with, and using shared equipment with, conventional cellular networks. Conventional cellular networks typically include network switches, for example MSCS, which are configured to receive complete directory numbers or activation feature codes in order to process mobile originating calls. For such networks a centralized method and means for step-by-step collection and analysis of the digits that a user has dialed is provided so that the wireless network can connect a call to the correct called party or activate the desired service. Since the analysis is centralized, it is relatively easy to update the analysis algorithm if the dialing plan of the territory of deployment changes.

Several embodiments according to this aspect of the invention are discussed. For such embodiments, in which the SU is capable of communicating via conventional cellular networks, the SU attempts to set up a communication link immediately upon sensing that the telephone has been placed off-hook, without waiting for the user to dial. The radio interface protocol of the conventional cellular radio system, typically requires the terminal to send, as part of its setup or origination message which establishes the communication link, a complete directory number or feature activation code. This communication link typically comprises both a communication channel and a signaling channel which are allocated to the terminal. In order to satisfy such a protocol, the SU's set up message includes a routing message which is immediately sent to a cellular network MSC, indicating the call is originating from a fixed wireless access SU, rather than a conventional cellular telephone. This causes the MSC to treat the call differently than calls originating from conventional cellular terminals, because the real directory number will be coming digit by digit, and these digits will have to be collected and analyzed, so that the conventional call processing system can process the call.

After the routing message is sent to the MSC by the SU, it is advantageous to provide an audible indication (e.g., dial tone) to the user in order to prompt the user to enter a directory number or feature activation code.

Digits dialed by the user are then sent to the MSC over the radio interface on a digit by digit basis for centralized collection and analysis. If the voice channel is suitable, DTMF produced by the telephony device, can be sent in-band over the voice channel. However, according to one embodiment of the invention suitable for systems which can not reliably pass DTMF in band over the voice channel, the SU converts DTMF produced by the telephony device into digit messages which are sent via a signaling channel to the MSC.

Meanwhile, upon receipt of a routing message, digits subsequently received by the MSC are sent to a digit collector and analyzer, which collects and analyzes the digits in order to determine the directory number or feature activation code entered by the user. The directory number or feature activation code is then processed in the usual manner.

Preferably, the digit collector and analyzer analyzes which digits are detected, the number of digits detected, and the time between them and relates this information to the dialing plan of the territory of operation to determine hen a complete directory number has been received. The digits are also analyzed to determine whether they represent a feature activation code. However, if delay is not considered problematic for the application, a simple time-out can be used instead of the above mentioned analysis. Embodiments which use such a simple time-out mechanism act on the assumption the user has finished dialing a complete directory number or feature activation code if no further digits are received after a suitable time period, for example 5 seconds, at which point whatever digits collected prior to time out are forwarded for call processing.

The digit collector and analyzer can be incorporated directly within an MSC. However, in order to utilize the invention with only relatively minor modifications to existing MSCs, advantageously the digit collector and analyzer can be incorporated within a new entity in the system, a "digit collection peripheral" (DCP), which is coupled to the MSC.

The above noted aspects of the invention are directed to providing fixed wireless access in coexistence with, and using shared equipment with, conventional cellular networks. Another aspect of the invention is directed to a dedicated fixed wireless access system which does not require an MSC or an equivalent.

In accordance with a broad aspect of the present invention there is provided a method of providing a requested service to a telecommunications terminal via a wireless network, the terminal being connected to the wireless network via a subscriber unit which provides an interface to the wireless network, the method comprising the steps of:

(a) detecting the terminal going off-hook;
(b) responsive to step (a), transmitting a set up message to the wireless network;
(c) the wireless network, responsive to receiving the set up message, establishes a communication link with the subscriber unit;
(d) transmitting dialed digits on a digit-by-digit basis to the wireless network via the communication link; and
(e) a wireless network component collects and analyzes the digits sent on a digit-by-digit basis by the subscriber unit and provides requested service corresponding to dialed digits.

In accordance with another aspect of the present invention there is provided a network switching center for a wireless network in which a terminal originates a call or requests a service by sending a set up message to a base station, said set up message including a routing message for notifying the wireless network that the terminal sends a directory number or feature activation code on a digit by digit basis, and upon establishing a communication link with the base station, sending a directory number or feature activation code on a digit by digit basis, the network switching center comprising; a call processor for identifying the presence of a routing message in any incoming call and for processing calls once a complete directory number or service feature activation code is received; a digit collector and analyzer, responsive to the call processor identifying the presence of a routing message, for analyzing the digits sent by the terminal in order to determine the directory number or service feature activation code sent by the terminal; and a signaling link for providing the call processor with the directory number or service feature activation code determined by the digit collector and analyzer.

In accordance with another aspect of the present invention there is provided a wireless subscriber unit for communicating with a wireless network comprising at least one telephony interface for connecting to at least one standard telephony device; at least one transceiver for establishing a communication link with the wireless network; and a controller for controlling the subscriber unit and, responsive to said standard telephony device going off hook in order to make an outgoing call, for instructing the transceiver to establish a communication link and send a routing message which identifies the subscriber unit as a remote wireless terminal which sends directory numbers or service feature activation codes digit by digit.

BRIEF DESCRIPTION OF THE DRAWINGS

The present invention, together with further objects and advantages thereof will be further understood from the following description of example embodiments with reference to the drawings in which.

DETAILED DESCRIPTION OF THE PREFERRED EMBODIMENTS

Figure 1:
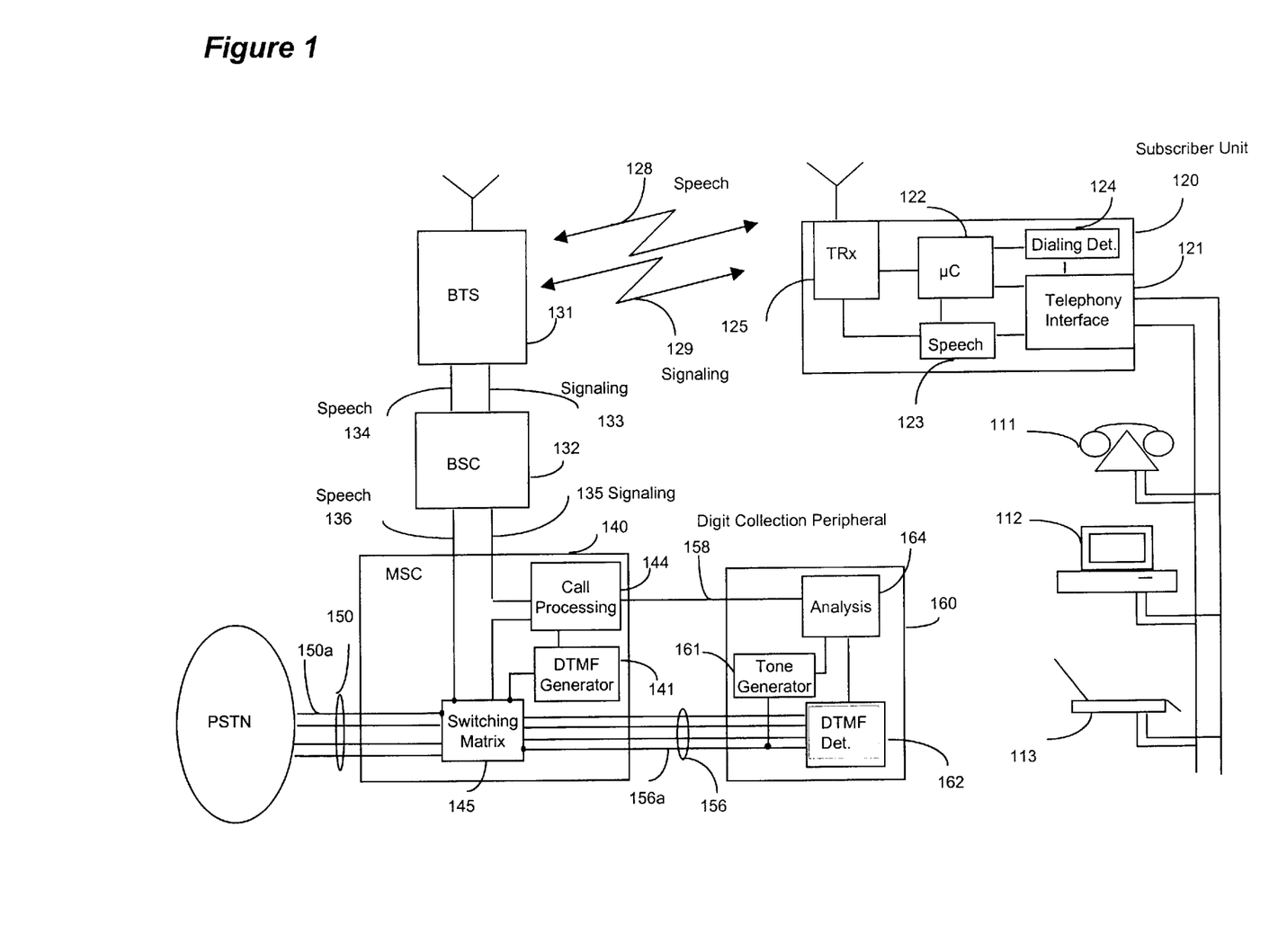
FIG. 1 is an illustration of a fixed wireless access system, compatible with a conventional cellular radio system, according to one embodiment of the invention.

In the illustration of FIG. 1, a system for providing fixed wireless access, according to an embodiment of the invention, is shown for use with a Global System for Mobile Communications (GSM) digital cellular network. GSM is standardized by the European Telecommunications Standards Institute. It is to be understood that the invention is not limited to a GSM network, or even limited to a cellular network, and that the examples shown and discussed can be suitably adapted to apply to other wireless communication systems.

The user's standard telephony device, for example, standard telephone 111, (and/or devices which also use a telephony interface, such as a modem 112 or facsimile machine 113 or other extensions (not shown)) connects to the subscriber unit (SU) 120 via a standard 2-wire analog telephony "tip and ring" interface. The SU of this embodiment contains the following functional blocks:

1) A telephony interface card 121, which performs functions similar to those of a telephone central office subscriber line circuit, such as providing dc voltage on the line, detection of the off-hook state, application of ringing voltage for alerting, 2-wire to 4-wire conversion of the speech signals in both directions, and over voltage protection.

2) A cellular radio transceiver 125, which provides communication with a base transceiver station (BTS) 131 which is within range. The radio transceiver contains radio modulation and demodulation circuits, and formats speech and signaling information into the appropriate radio interface protocol. For example, it will respond to instructions from microcontroller 122 to set up a radio link and carry out the appropriate signaling over the radio interface with the BTS to set up a call. The radio interface between the SU 120 and BTS 131 comprises both speech 128 and signaling 129 channels.

3) A microcontroller 122, which controls SU, including the states of the transceiver and telephony interface. For example, upon being informed by the telephony interface block 121 that the telephony device has entered the off hook state from an idle state, the microcontroller instructs the radio transceiver to establish a radio link and sets up a call by sending a suitable setup message on the signaling channel 129. The microcontroller also interfaces with the speech processing subsystem 123, and can inject digitized speech samples representing call progress tones into the speech path towards the telephone. For example, if the radio transceiver 125 fails to establish a radio link in response to the off hook state of the telephone, the microcontroller injects samples of digitized reorder tone from memory into the speech path towards the telephone.

4) A speech processing subsystem 123 formats analog voiceband signals to and from the telephony interface to the representation used over the radio interface (which may be analog or digital). For example, for an analog radio interface, this subsystem performs pre-emphasis/de-emphasis filtering of certain voiceband frequencies. For a digital radio interface, this subsystem performs analog to digital conversion and digital compression of the speech information., 5) A dialing detector 124 detects DTMF tones and/or loop disconnect dialing from the telephony interface. The dialing detector can be implemented by electronic circuits, such as filters, timers and rectifiers, or it can be implemented in the microcontroller 122 and speech processing 123 circuits themselves as digital signal processing code which analyzes digitized samples of the speech channel from the telephone. Such means are well known to those skilled in the art and need not be elaborated here.

The BTS 131, also known simply as a base station, is connected to a base station controller (BSC) 132, which is, in turn, connected to a network switching center, for example, mobile switching center (MSC) 140. For ease of illustration, FIG. 1 shows logically separated signaling links 133, 135 and speech links 134, 136. These links can, of course, be multiplexed on the same physical link in practice. The MSC 140 connects to the PSTN via suitable facilities, for example a collection of trunks 150. The MSC 140 includes a DTMF generator 141 for generating DTMF tones in response to receiving appropriate signaling messages a call processing module 144, and a switching matrix 145 comprising input ports and output ports for routing a call to a vacility selected by call processing. In this embodiment, the network components 131–135, 140, 141, 144, 145 and 150 are configured to provide both fixed wireless access and conventional cellular telephony according to the GSM standard. In a conventional GSM MSC, call processing module 144 would receive a complete directory number (or activation code) from a GSM terminal and instruct the switching matrix 145 to connect the call, for example, by selecting trunk 150a and routing the call to the PSTN (or activate the requested feature). According to the embodiment of FIG. 1, an additional network component, a Digit Collection Peripheral (DCP) 160 also connects to the MSC 140 via suitable facilities, for example trunks 156, which provide speech paths, and via a signaling interface 158, which provides call control. The details of DCP 160 will be described in more detail below. In brief, the DCP performs some initial call processing analysis, by collecting the digits which are received on a digit by digit basis from the SU 120 for step by step analysis in order to determine the directory number or feature activation code entered by the user and sent by the SU.

The operation of the network of FIG. 1 will be discussed with reference to FIG. 2 which is a flow chart of the actions which occur in the SU to originate a call and dial a number, according to one embodiment of the invention. When telephone set 111 (or other telephony device connected to the telephony interface 121) goes off-hook, the telephony interface 121 detects this state 210 and sends a signal to the microcontroller 122. The microcontroller 122 sends instructions to the transceiver 125 to originate a communication link to the BTS 131 at step 214. This communication link comprises speech channel 128 and signaling channel 129 which are allocated to the terminal. Step 214 includes sending a routing message to identify the SU as a fixed wireless access terminal (as opposed to a conventional cellular terminal). In this embodiment, this routing message takes the form of a predefined directory number (for example: 9999) stored in the microcontroller or associated memory. The transceiver sets up a call using conventional signaling particular to the cellular radio system. The signaling corresponds to the signaling used by a mobile cellular subscriber terminal for which the user had entered the predefined directory number and then pressed "SEND". If the transceiver 125 is unsuccessful in setting up a link to the BTS, a message is sent to the microcontroller 122, as shown at step 218. The microcontroller then generates digitized samples of a reorder tone 222 which is injected into the speech processing circuitry in the receive direction, and thence to the telephone 111. This serves as an audible indication that the user will need to redial at a later time. Of course, other indications can be used.

If the link to the BTS is successful, the BTS 131 and BSC 132 utilize signaling links 133 and 135 to the MSC 140 to transmit the routing message to the MSC call processing module 144. In the embodiment shown, the routing message is the predefined directory number 9999. When the MSC call processing 144 analyzes the directory number, for example, by consulting a series of fill tables, it recognizes that the particular number corresponds to the DCP 160. In this case, rather than selecting a trunk 150 to the PSTN, the MSC call processing selects an available trunk, for example 156*a*, from the set of trunks 156 to the DCP and routes the call to the DCP.

If the MSC is unsuccessful in obtaining an available trunk to the DCP, for example, if all trunks are in use, the MSC sends an appropriate signal to the SU via signaling channels 133, 135. This signal is used by the SU, as shown at step 226, in order to determine whether a link to the DCP is established. If not, the microcontroller generates digitized samples of reorder tone which is injected into the speech processing circuitry in the receive direction, and thence to the telephone 111, as shown at step 230.

Assuming a trunk to the DCP is available, the DCP answers the call from the MSC on the trunk, establishing a speech path from the SU 120 to the DCP 160. The DCP tone generator 161 generates dial tone which reaches the subscriber via the speech paths 136, 134, 128, to the telephone. Dial tone serves as an audible indication to the user that a radio link exists and the user can dial the digits of the directory number he wants to reach, as shown at step 234.

Figure 2:
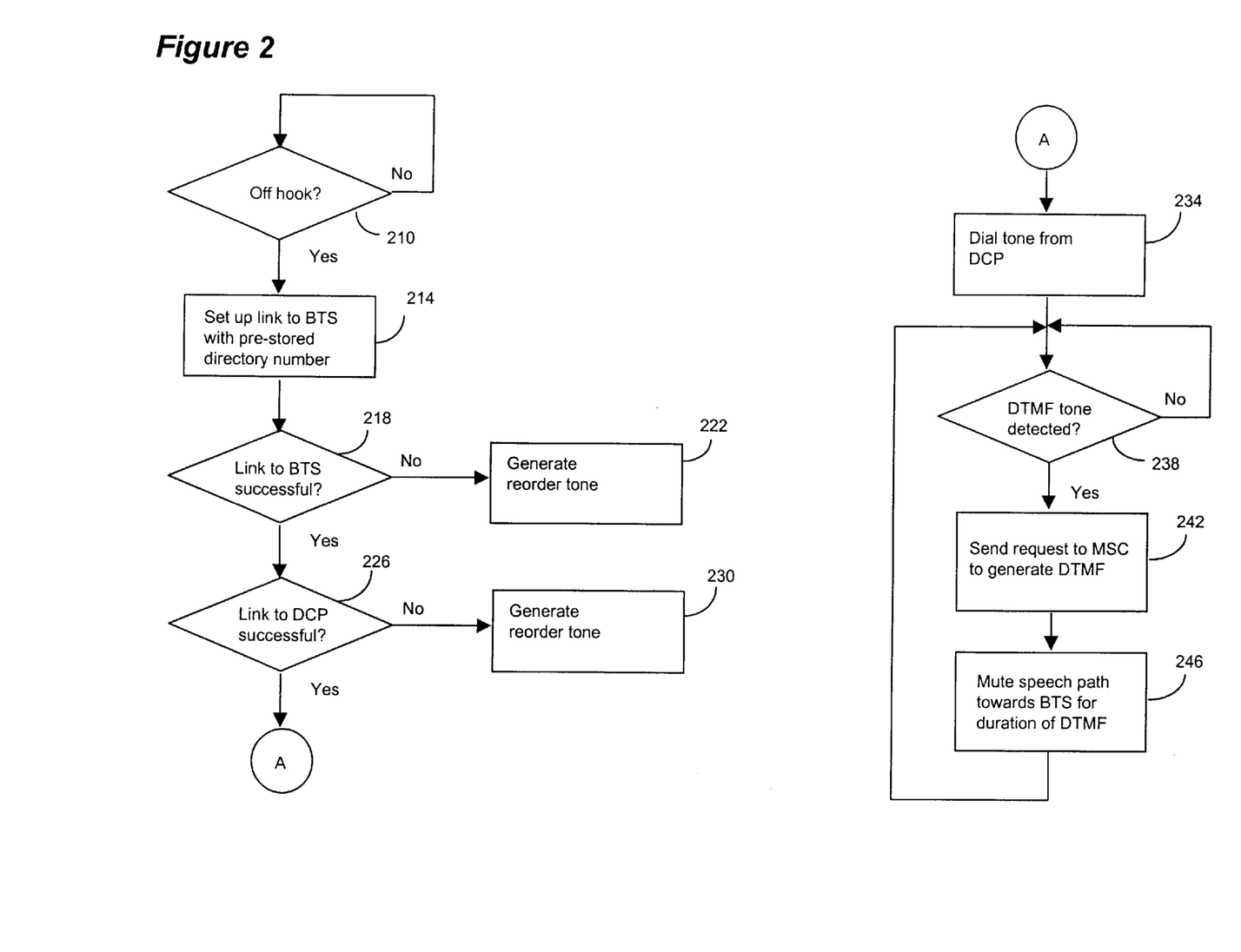
FIG. 2 is a flow chart of steps carried out by the microcontroller of an SU, according to one embodiment of the invention, in order to set up an outgoing call.

FIGS. 1 and 2 illustrate an embodiment of the invention which is particularly suited for cellular systems in which the speech channel is unsuitable for transmitting DTNF tones reliably in-band. A messaging protocol exists in such cellular radio systems to allow cellular terminals to send digit messages to the MSC which cause the DTNF generator 141 to generate appropriate DTMF tones on a speech path towards the telephone network so that the user can operate DTMF-responsive equipment, such as an answering machine, at the called end.

In such a system, when the user dials or enters digits using either loop disconnect dialing (sometimes called rotary dial or dial pulse) or DTMF tones as produced by telephone 111, these digits need to be converted to the appropriate digit messages by the SU 120. Thus, each dialed digit is detected (step 238) by the dialing detector 124, which indicates each digit to the microcontroller as soon as it is detected. When the microcontroller is informed of detection of a digit, it causes the transceiver to send a digit message 242 to the MSC (via the signaling links 133, 135) requesting the MSC generate the corresponding DTMF digit. To prevent the DCP 160 or far end DTNF receiver from receiving two sources of DTNF, namely, the DTNF generated by the MSC, and the DTMF generated by the telephone (which may be corrupted if the speech channel is unsuitable for transmitting DTMF tones in-band), the microcontroller instructs the speech processor 123 to mute the speech path in the direction towards the BTS 131 whenever the dialing detector 124 detects any DTMF tones as shown at step 246.

Figure 5:
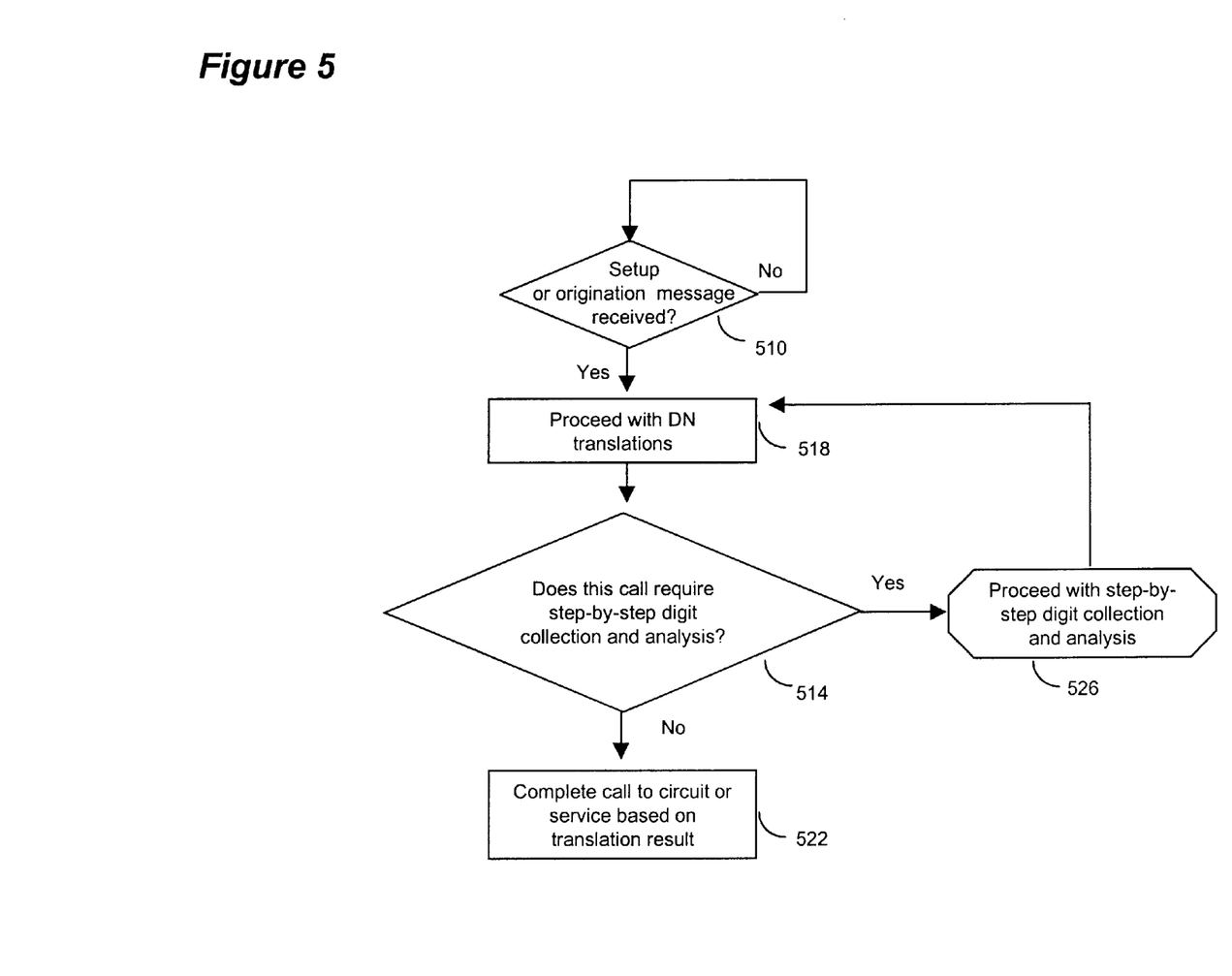
FIG. 5 is a flow chart of steps carried out by MSC call processing according to one embodiment of the invention.
Figure 6A:
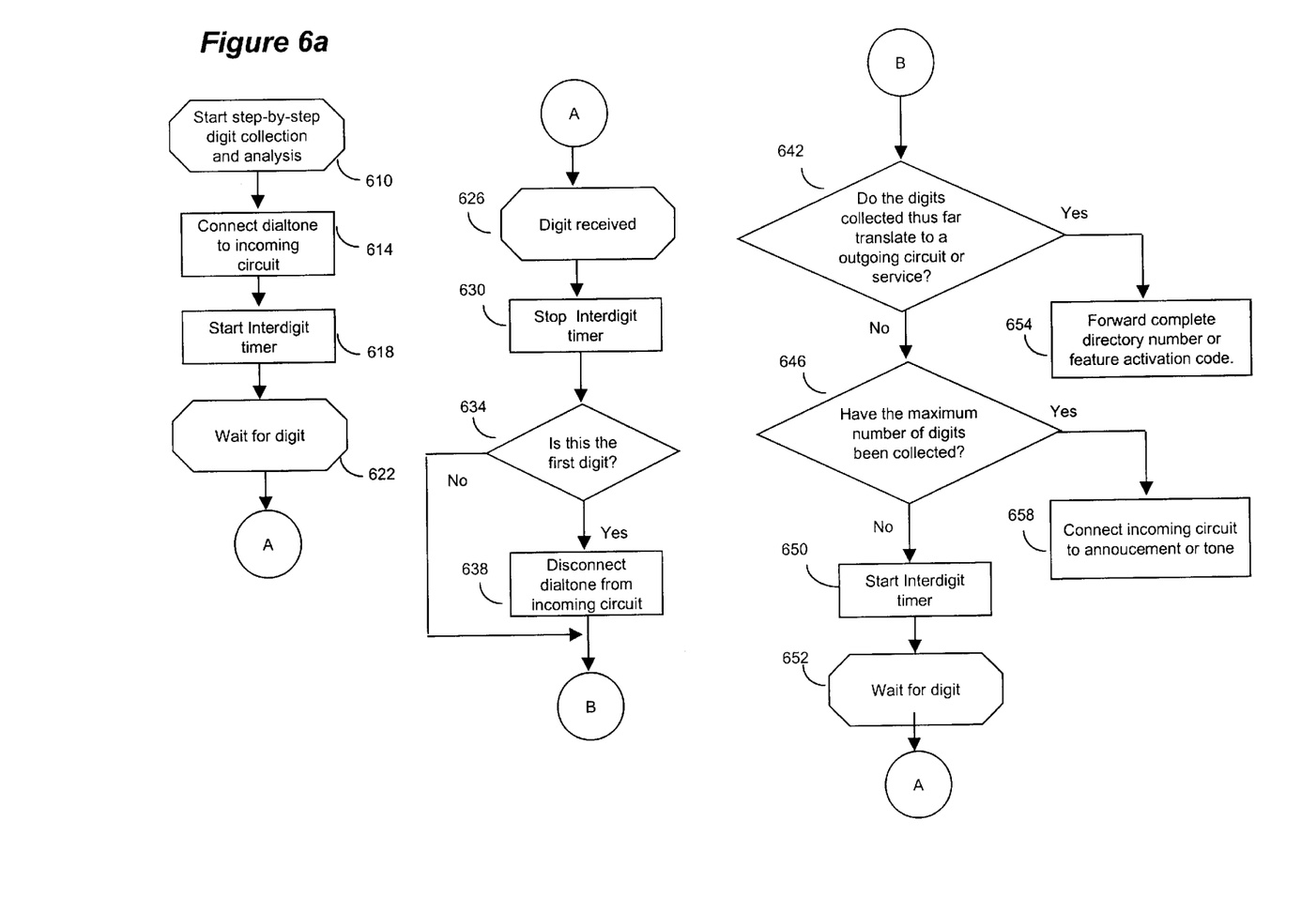
FIG. 6 is a flow chart of the steps carried out by a digit collector and analyzer, according to one embodiment of the invention, for collecting and analyzing digits.
Figure 6B:
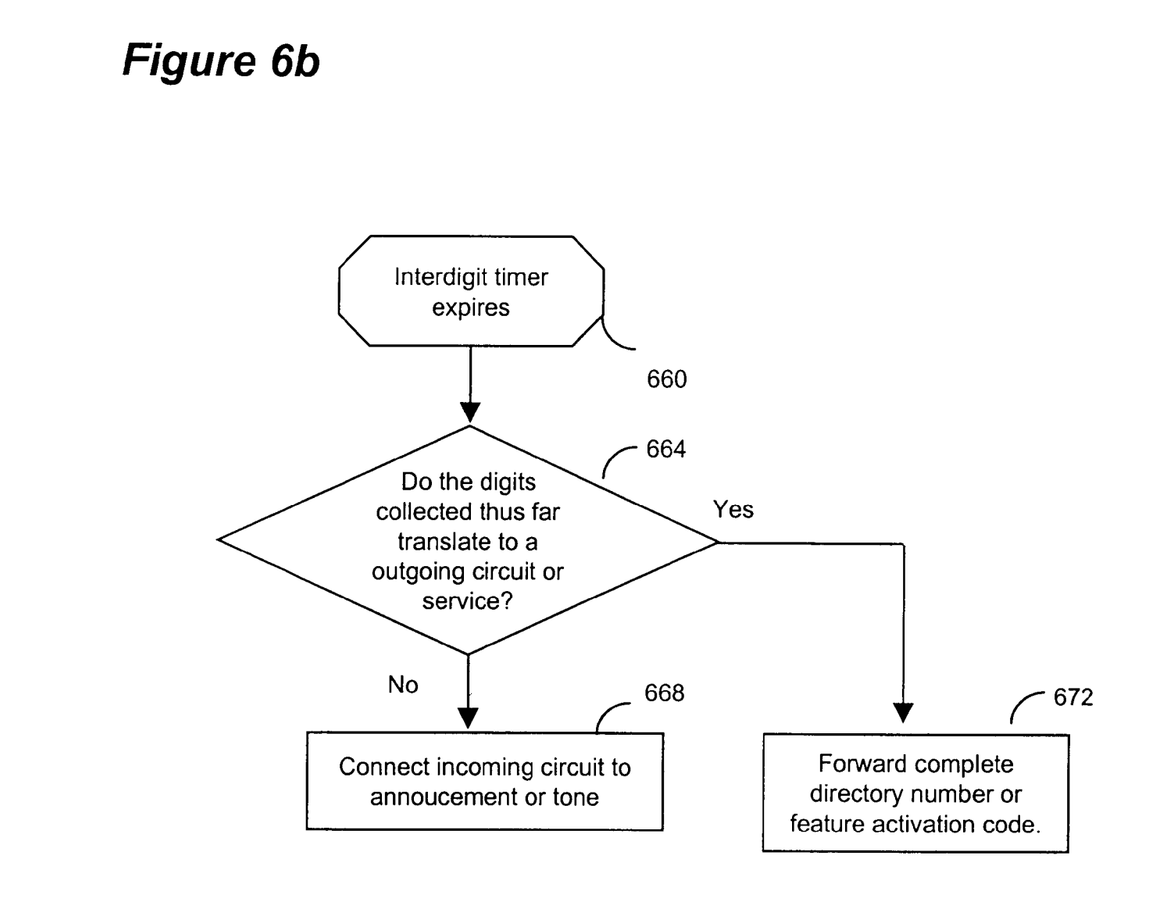

An example of the call processing carried out once the MSC receives a routing message is discussed below with reference to FIGS. 5 and 6. When a setup or origination message is received, MSC call processing 144 detects this 510 and determines if the call requires centralized step-by-step collection of dialed digits based on the presence of a routing message. In this embodiment, where the routing message is a specific directory number, this is determined when the digits in the setup or origination message are used for directory number (DN) translations in the usual manner for cellular switches 518. The translation data base is updated to include the directory number, and suitable instructions for routing the call to the DCP for digit collection and analysis. If step-by-step digit collection is not to be used, the call is completed to a circuit or service based on the translation result 522 in the usual manner. If the call requires centralized step-by-step collection of dialed digits step 526, MSC call processing selects a trunk, for example 156*a*, for routing the call to the DCP 160. When the MSC receives each digit message requesting generation of a DTMF digit from a SU, DTMF generator 141 generates the requested digit, which is sent on the trunk 156*a* to the DCP 160. Note that DTMF is generated even if the user used loop disconnect dialing on the telephone set.

The DCP 160 contains a DTMF detector 162 and digit collector/analyzer module 164. The DTMF detector 162 provides an indication of what DTMF tone was detected to the digit collection and analysis module 164 as soon as each valid DTMF tone is detected. The operation of DCP 160 will be discussed with reference to FIG. 6, which is a flow chart of the actions which occur in the DCP 160 in general, and in the digit collector/analyzer module 164 in particular. When a call is routed to the DCP, dialtone generator 161 is connected to the subscriber's incoming circuit 614. An interdigit timer is also started to detect a non responding subscriber or non functioning equipment and also as one of the means to declare an end to the subscriber's dialing action. (Other means to declare an end to the subscriber's dialing action could include having the user dial special digits such as the octothorpe '#' digit.) The interdigit timer value for the first digit may be longer than subsequent interdigital timer values to accommodate system and subscriber reaction times. The digit collector/analyzer 164 then waits for a digit from the subscriber 622. When a digit is received 626, the interdigit timer is stopped 630. If this is the first digit received, the tone generator 161 is disconnected from the incoming circuit 638. Based on the translation scheme in effect for this subscriber, the digits collected up to this point in the call are analyzed or translated 642. Digit translation methods are well known to those skilled in the art of designing and manufacturing switching devices or equipment and need not be elaborated here. If enough digits have not been collected to unambiguously identify an outgoing circuit or service then the maximum number of allowed dialed digits is checked 646. Optionally, dialing plan information can be utilized to set a default maximum number of digits, depending on the first digit (or digits) dialed. For example, as long as the first digit is not an 0 or 1, and the first three digits are not "411" or "911" then the maximum number of digits is 7, whereas if the first digit is 1, then the maximum number of digits is 11, etc. If more dialed digits are allowed, the interdigit timer is started 650 and the digit collector/analyzer then waits for a digit from the subscriber 652. If more digits are not allowed, the incoming circuit is connected to an announcement or tone to indicate the improperly dialed number to the subscriber 658. If the digits collected correspond to an outgoing circuit or service, then the directory number or feature activation code is sent to call processing 654 so that the incoming circuit can be connected to the identified outgoing facility or the service (e.g. call forwarding service) can be activated, as set out below. If the interdigit timer expires 660, then the digits collected, up to this point in the call are analyzed or translated 664. If, based on the digits collected and the number of digits collected, an unambiguous outgoing facility or service can be identified, then the directory number or feature activation code is sent to call processing 672 so that the incoming circuit can be connected to the identified outgoing facility or the service can be activated, as set out below. If translation of the dialed digits cannot identify a circuit or service, the incoming circuit is connected to a treatment in the form of an announcement or tone to indicate the improperly dialed number to the subscriber 668.

Once the DCP has determined that a valid directory number or service feature request has been entered, it sends the dialed number to the MSC via the signaling interface 158. The MSC stores the directory number for such purposes as billing. At this point, step 526 in FIG. 5 is complete, so call processing proceeds with DN translation 518 on the number sent via signaling link 158. The MSC then either activates the feature/service requested (or sends a suitable request to the PSTN if the request is a PSTN feature, rather than a MSC feature) or originates a call to the dialed directory number on a trunk, for example 150*a*, from the pool of trunks 150. The MSC also connects this trunk to the speech path from the SU, at which point, the link to the DCP is dropped using a suitable release link protocol. Alternatively, for MSCs which support call transfer requests, the DCP sends a request to the MSC on signaling link 158, to transfer the call from the DCP to the analyzed directory number.

In the above embodiments, there may be a delay of up to several seconds between the telephone being placed in the off hook state, and the call progressing to the point where either dial tone or reorder tone is heard. This time period, during which the subscriber receives no audible feedback about the call state, may be unacceptable for some users, who expect nearly instantaneous dial tone once they go off hook. Therefore, the SU can optionally include a tone generator which generates a local dial tone to the telephone immediately upon detecting the off hook state of the telephone. Advantageously, this local dial tone is replaced by either the dial tone from the DCP (step 234 of FIG. 2) or reorder tone (steps 222 or 230 of FIG. 2) when the call progresses to the point where one of these indications is available. Alternatively, rather than include a separate tone generator for producing dial tone, the microcontroller can generate its own audible indicator, for example, digitized samples of dial tone, which may be inserted into the speech processing circuit and thence into the speech path to the telephone. Either way, if this option is included, it is possible that the user may begin dialing prior to the radio link being established. In this case, if the dialing detector 124 detects a dialed digit while the local dial tone is still present, then the microcontroller removes the local dial tone. Dialed digit messages are then buffered temporarily while waiting for the radio link to be established. However, these messages do not need to be stored until dialing is finished. Buffered digits are sent once the radio link is established.

In another embodiment more suited to some cellular systems, such as North American digital cellular, the messages sent over the radio interface requesting generation of DTMF tones cause the tones to be generated and inserted onto the speech path at the BTS or BSC, instead of at the MSC. In other words, DTMF generator 141 is located in the BSC rather than the MSC.

In an alternative embodiment suitable for cellular systems which are capable of passing DTMF tones in-band within the speech channel without significant distortion after the initial call setup message, e.g. the North American AMPS system or GSM with an enhanced speech vocoder, the SU can allow DTMF tones to be transmitted from the telephone through the transceiver 125, the BTS, BSC and MSC through to the DCP all in the speech path. Thus, the MSC does not receive digits in the form of digit messages, but rather receives actual DTMF tones. The MSC passes the in-band DTMF tones from the subscriber's voice circuit to the trunk to the DCP. If the telephone 111 produces DTMF, the SU need not contain a dialing detector 124. However, if the telephone uses loop disconnect dialing, the dialing detector 124 detects the digits and indicates each digit as it is detected to the microcontroller. The microcontroller generates digitized samples of the corresponding DTMF tone and inserts them into the speech path to the transceiver. Thus, loop disconnect dialed digits are converted to DTMF tones with the SU.

It should be noted that in a cellular system which is capable of passing DTMF tones in-band without significant distortion, the previously described out-of-band method can still be used, because it has the advantage of allowing dialing to occur before a radio link is set up, by buffering the digit messages until a radio link is established, as described above. In this case, once the call to the called party is set up; i.e. outgoing facility 150*a* has been engaged, any further DTMF generated by the telephone can reach the far-end device, for example, an answering machine, by one of two methods. In the first such method, the SU continues to detect DTMF tones and translate these into out-of-band signaling messages which cause the DTMF generator 141 in the MSC to generate DTMF tones on the outgoing voice facility 150*a*. In the second such method, if the cellular system provides a signaling indication to the SU that the call has been set up to the far end, then after receipt of such a message, the SU stops detecting DTMF tones; instead DTMF tones generated by the telephone simply travel in the speech channel to the far end device without any action taken by the SU or MSC. In the above discussions, the DCP receives an indication of the digits dialed by the user in the form of DTMF, regardless of whether DTMF is sent by the terminal in band, or not. For systems using out-of-band signaling messages, the above example showed how these signals can be converted to DTMF, which is then passed on a speech channel to the DCP. This has the advantage of allowing a single DCP design to be used for different applications. However, it should be noted that, as an alternative, the DCP can be configured to receive and process the out-of-band signaling messages directly.

Figure 3:
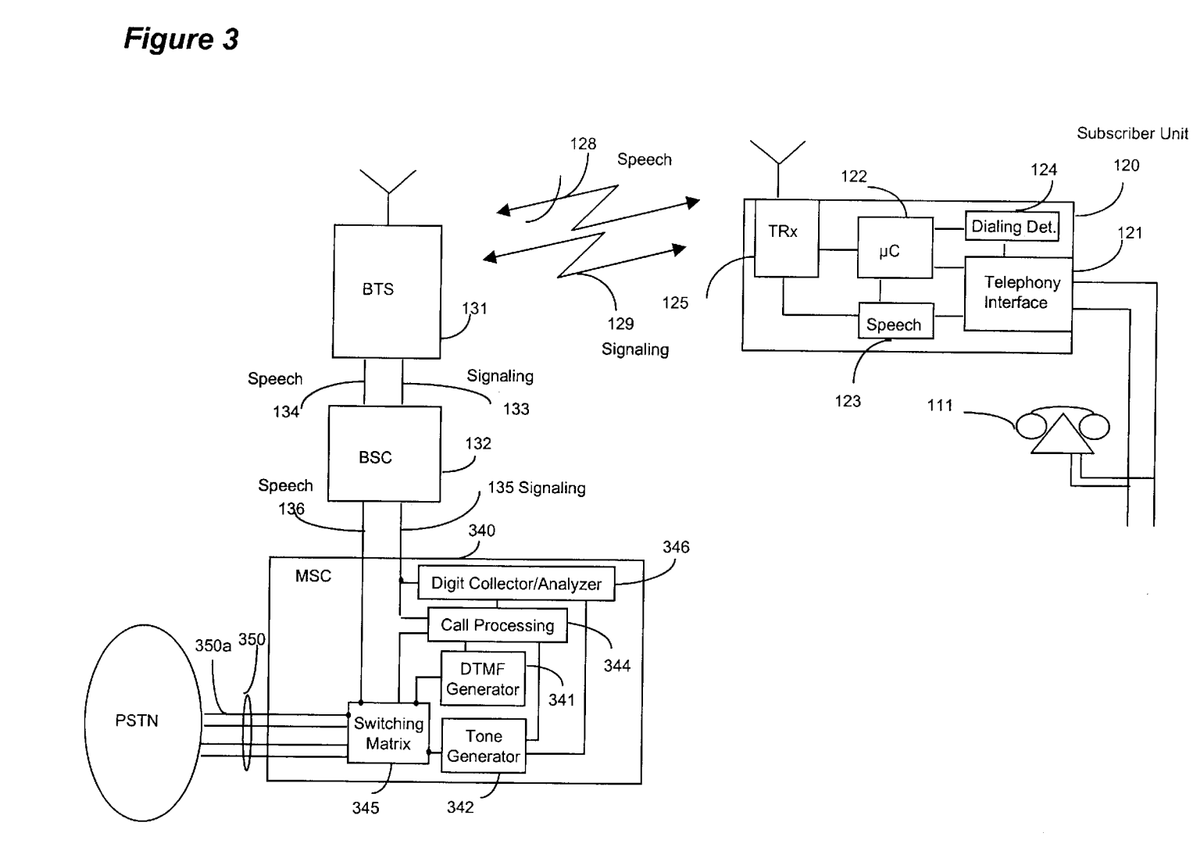
FIG. 3 is an illustration of an alternative embodiment of the invention.
Figure 4:
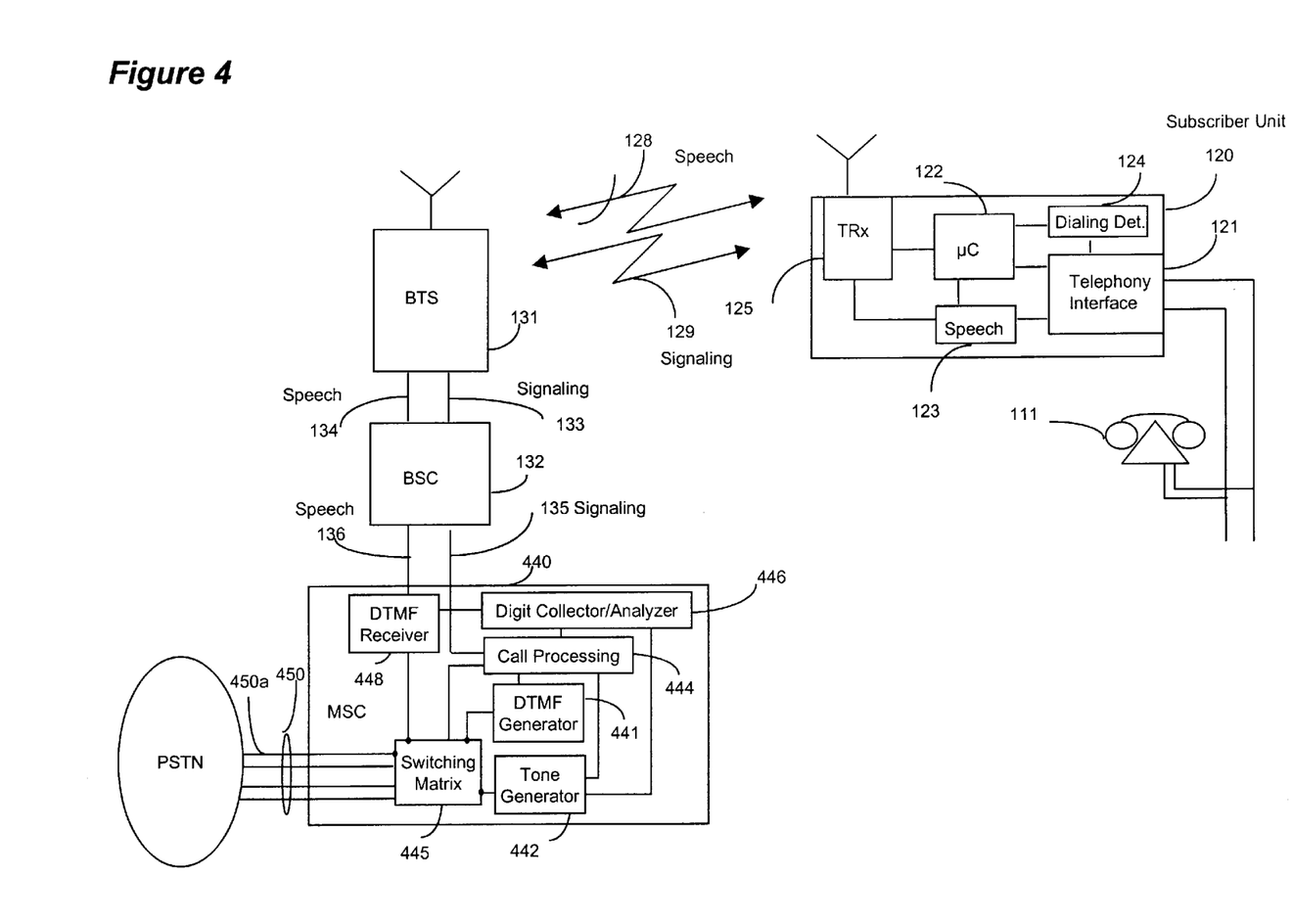
FIG. 4 is an illustration of yet another alternative embodiment of the invention.

FIGS. 3 and 4 are illustrations of alternative embodiments in which the functionality of the DCP is built into the MSC. FIG. 3 illustrates such an embodiment in which signals requesting DTMF be generated at the MSC are passed via an out-of-band signaling channel. FIG. 3 is similar to FIG. 1, and in which equivalent elements are labeled as in FIG. 1, except the DCP is eliminated, and the MSC 340 includes a tone generator 342 and a digit collector/analyzer 346. Upon link set-up, call processing 344 carries out DN translations as per above. If this determines that the call requires step-by-step digit collection and analysis, then the MSC connects tone generator 342 to the subscriber's voice circuit for purposes of supplying a suitable audible indicator, for example, dialtone or other network tones, to the subscriber circuit. The SU 120 sends messages conveying requests to generate DTMF as per the embodiment shown in FIGS. 1 and 2. These messages are collected at the MSC, and indications of the requested digits are passed to digit collector/analyzer 346. DTMF is not actually generated. The digit collector/analyzer 346 analyzes which digits are detected in accordance with FIG. 6, as discussed above, in order to determine the directory number or feature activator code sent by the terminal. A signal indicating this number is then sent to call processor 344. The MSC then either provides the requested service or selects a trunk, for example 350a from the pool 350 and originates an outgoing call to the indicated directory number or activate the requested feature in the same manner as if the MSC had received the number from a conventional cellular terminal. After this point, the MSC operates normally as for conventional mobile cellular calls. For example, any further messages received from the SU which indicate requests to generate DTMF would cause the MSC DTMF generator to insert and generate the requested tone onto the trunk 350a.

FIG. 4 is an illustration of an alternative embodiment at the MSC, similar to that portrayed in FIG. 3, except that DTMF is conveyed from the SU to the MSC 440 in-band on the speech channel 128, 134 and 136, rather than via out-of-band signaling messages. In this embodiment, when a link is set up, the MSC would apply dial tone to the subscriber's voice circuit using tone generator 442. In this embodiment, the MSC also includes a DTMF receiver 448 which is connected to the subscriber voice circuit for the purpose of identifying DTMF digits and collecting them. As DTMF in-band tones are detected, the tone receiver would send digit messages to the digit collector/analyzer 446. The MSC digit collector/analyzer 446 then analyzes the dialed digits and determines how the call should progress, in the same manner as discussed above.

In any of the above embodiments, the MSC is capable of supporting a mix of conventional mobile cellular subscriber terminals and fixed wireless access SUs. The conventional mobile cellular subscriber terminals sends a complete directory number at initial call setup, while the fixed access SUs indicate dialed numbers digit-by-digit after initial call setup. As the MSC must identify which type of terminal is originating the call, in order to choose, for example, whether or not to route the call to a DCP, the SU sends a routing message to the MSC. In the above discussions, this routing message has taken the form of a predefined directory number, e.g., "9999". This routing message could take other forms, for example:

(a) A serial number associated with the subscriber terminal, is sent in a message from the terminal to the MSC at call set-up. The MSC recognizes SUs from fields within this serial number. In the GSM standard, there is a serial number associated with the terminal or Mobile Equipment (ME) known as the International Mobile Equipment Identifier (IMEI) which is sent from the ME to the MSC at call set-up. The MSC, upon receiving an IMEI, can look up the characteristics of the ME from a data base, known as the Equipment Identity Register (EIR). This database could store an indication as to whether a terminal with a particular IMEI was a conventional mobile cellular subscriber terminal or an SU.

(b) A unique identifier associated with the subscriber is sent in a message from the terminal to the MSC at call set-up. The MSC, upon receiving this indication, looks up the subscriber's service profile from a database. For example, in the GSM standard, the International Mobile Subscriber Identity (IMSI) and Temporary Mobile Subscriber Identity (TMSI) uniquely identify a subscriber and subscriber service profiles are stored in databases known as a Home Location Register (HLR) or Visitor Location Register (VLR). An indication that a particular subscriber is only using equipment which is either a conventional mobile cellular terminal, or an SU could be stored in such a database.

(c) A unique signaling message for this purpose.

If such an alternative routing message is used, MSC call processing will of course need to be updated to include a mechanism to evaluate it, prior to performing DN translations. Or, as an alternative, the BSC can include a mechanism for detecting such a routing message. In which case, the digit collection and analysis can take place at the BSC prior to sending the complete dialed number to the MSC. In this case, the MSC processes the call in the conventional manner.

Various alternatives can be made to the systems described above. For example, more than one BTS can be connected to the BSC, and more than one BSC can be connected to the MSC. Furthermore, the BSC may not be necessary as the BTS 131 could be connected directly to the MSC in some systems. The MSC need not connect directly to the PSTN. The MSC 140 could instead connect to a network of other MSC's (not shown). Furthermore, although only an external connection is shown between the SU and the terminal, an integrated unit comprising the SU, a terminal and an internal connection between the two can be used. Also, it should be noted that the SU can support multiple extensions. Furthermore, the SU can act as a key telephone system by including multiple transceivers and telephony interfaces.

In another embodiment, as an alternative to SU carrying out steps 226 and 230, if the MSC is unsuccessful in obtaining an available trunk to the DCP, then the MSC inserts a reorder tone or some other audible indication via a suitable generator, not shown, onto the speech circuit to the SU so that the recorder tone reaches the telephone's receiver. In this embodiment, the SU does not generate reorder tone locally except in the case 218 where it is unsuccessful in gaining a link to the BTS.

It should be noted that the indications provided to the subscriber could be some other audio signal other than dial/reorder tone, such as a digitized voice message.

Figure 7:
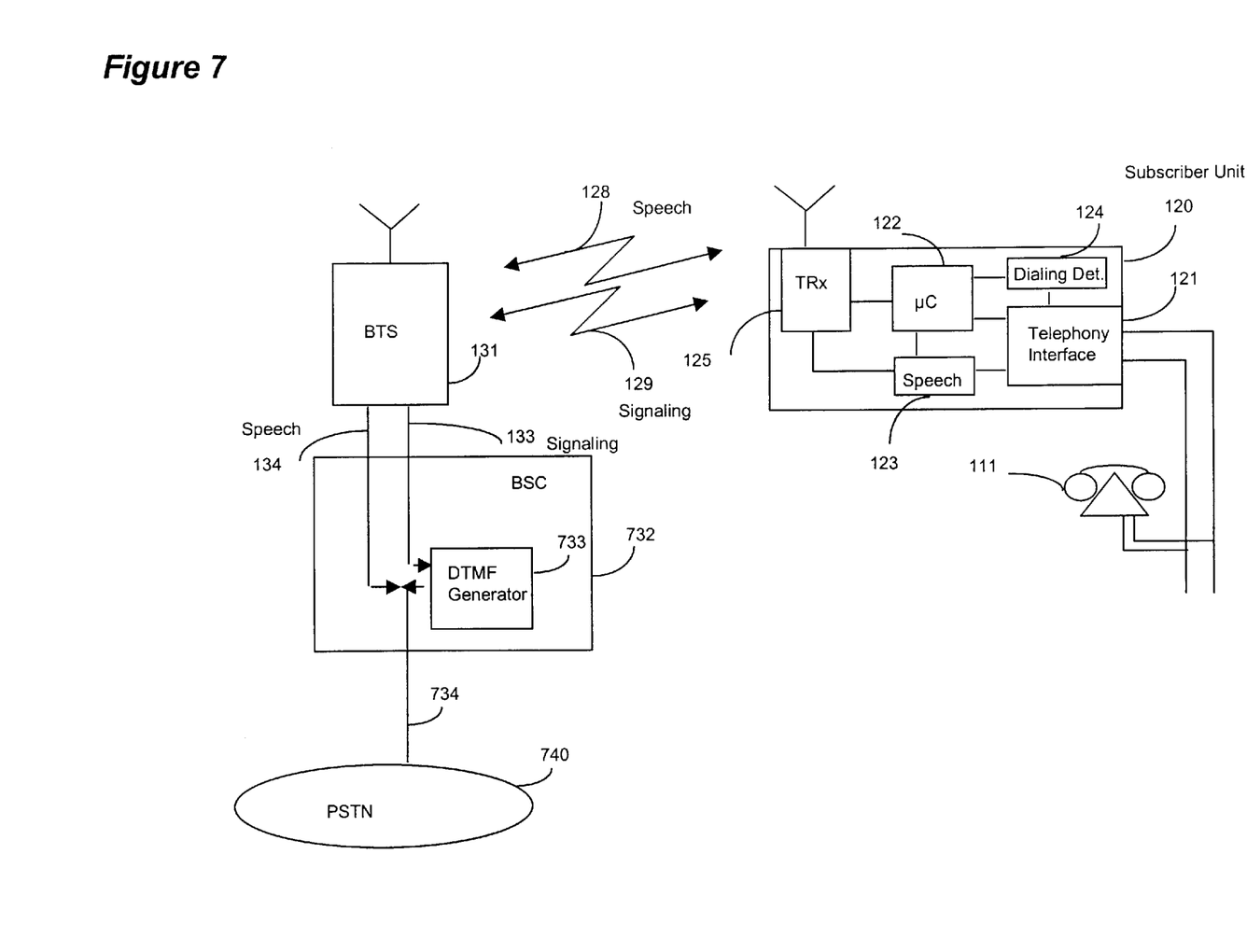
FIG. 7 is an illustration of an alternative embodiment of the invention.

FIG. 7 illustrates yet another embodiment of the invention, which is configured to support only fixed access subscribers, without conventional cellular subscribers. For ease of illustration only a standard telephone 111 is shown connected to the SU, although it should be appreciated that other extensions and/or devices can be supported. In this embodiment, a subscriber is associated with a particular BSC 732 and since no mobility is required, the BSC is connected directly to the PSTN 740. In this embodiment, BSC 732 includes a DTMF generator 733. When a subscriber goes off-hook, a link is set up to the BTS 131 and thence to the BSC 732. In this embodiment, the SU does not need to send a routing message. The BSC immediately selects a voice facility 734 to the PSTN 740. The voice facility 734 can be a telephone loop explicitly associated with that particular subscriber, or alternatively, it can be a trunk from a pool. The SU converts dialed digits as soon as they are detected into out-of-band messages on the radio interface as described above. As each message is received at the BSC, the DTMF generator 733 inserts the corresponding DTMF tone onto the voice facility 734. Hence, DTMF digits are passed to the PSTN as digits are dialed, just as they would be if a conventional telephone were connected to the voice facility 734. In this embodiment, the PSTN carries out the function of determining the called directory number and handles billing. If DTMF is generated by the telephone, then the SU mutes the speech path towards the BTS while DTMF digits are detected by the dialing detector 124, so as to prevent two sources of DTMF from reaching the PSTN.

This embodiment, also supports the use of loop disconnect signaling, as the signaling method for conveying dialed digits between the BSC and PSTN. In this case, the DTMF generator 733 is replaced with means for periodic momentary disconnection of the physical loop corresponding to the voice circuit 734. Note that the means of conveying dialed digits to the PSTN (loop disconnect or DTMF) may be different or the same as the means of conveying dialed digits between the telephone 111 and the SU 120. In this embodiment, when the SU goes off-hook, dial tone can be supplied to the user in one of two ways. First, as described above, as soon as the radio link is set up, a voice connection is made between the PSTN and the SU via the BSC and BTS. In this case dial tone is supplied by the PSTN. Alternatively, dial tone can be simulated by the SU, once the telephone hand set goes off hook. This, of course, can potentially provide the user with a false indication that a radio link in fact exists, but this at least provides the user with dial tone during the interval in which the radio link is established. In this case, the user could potentially start dialing before the radio link is established. In this case, the dialed digits will need to be buffered until the link is established, at which point the buffered digits will be sent over the radio link, and any subsequently dialed digits will be sent when dialed.

It should be noted that alternative signaling methods, for example, CCS7 or Common Associated Signaling can be used instead of DTMF, in which case DTMF generator 133 would be replaced with a suitable signaling means.

In an even simpler embodiment related to the embodiment of FIG. 7, for use in systems in which the speech path of the radio interface is capable of passing DTMF tones in-band, dialed digits are conveyed in-band between the telephone 111 and the PSTN via DTMF tones. In this embodiment, there is no dialing detector 124 and no out-of-band messages are sent over the radio interface to indicate dialed digits. In this embodiment, when the SU detects an off-hook state of the telephone, it sets up a radio link, and sends a suitable set up or originating message to the BSC, which causes the BSC to go off-hook on the voice facility 734 to the PSTN. DTMF tones generated by the telephone pass in the speech channel to the BSC and on to the PSTN, where they are detected, just as in the case of a telephone directly connected to the facility 734. In this case, dial tone will be supplied by the PSTN.

Numerous modifications, variations and adaptations may be made to the particular embodiments of the invention described above without departing from the scope of the invention, which is defined in the claims.

What is claimed is:

1. A network switching center for a wireless network in which a terminal originates a call or requests a service by sending a set up message to a base station, said set up message including a routing message for notifying the wireless network that the terminal sends a directory number or feature activation code on a digit by digit basis, and upon establishing a communication link with said base station, sending a directory number or feature activation code on a digit by digit basis, said network switching center comprising;

a call processor for identifying the presence of a routing message in any incoming call and for processing calls once a complete directory number or service feature activation code is received;

a digit collector and analyzer, responsive to said call processor identifying the presence of a routing message, for analyzing the digits sent by said terminal in order to determine the directory number or service feature activation code sent by said terminal; and a signaling link for providing said call processor with said the directory number or service feature activation code determined by said digit collector and analyzer.

2. A network switching center as claimed in claim 1, wherein said network switching center comprises an MSC for processing calls originating from said first group of terminals and a peripheral, coupled to said MSC, wherein said MSC comprises said call processor, and said peripheral comprises said digit collector and analyzer.

3. A network switching center as claimed in claim 1, wherein said network switching center comprises a tone generator for providing an audible indication to the user that a communication link has been established.

4. A network switching center as claimed in claim 1, further comprising a DTMF receiver, responsive to said call processor identifying the presence of said routing message, for detecting DTMF tones sent in band by said terminal and indicating the corresponding digits to said digit collector and analyzer.

5. A network switching center as claimed in claim 1, further comprising means for detecting out of band signaling messages sent by said terminal requesting the generation of DTMF tones and wherein, responsive to said call processor identifying the presence of said routing message, said call processor establishes a communication link for forwarding the corresponding digits to said digit collector and analyzer.

6. A network switching center as claimed in claim 2, further comprising:

a voice facility linking said MSC with said peripheral;

and wherein said MSC further comprises:

detection means for detecting out of band signaling messages sent by said terminal requesting the generation of DTMF tones; and a DTMF generator, responsive to said detection means, for generating the requested DTMF tone on said voice facility;

and wherein said peripheral further comprises a:

a DTMF detector for detecting DTMF tones generated on said voice facility and indicating the corresponding digits to said digit collector and analyzer.

7. A wireless subscriber unit for communicating with a wireless network comprising:

at least one telephony interface for connecting to at least on standard telephony device;

at least one transceiver for establishing a communication link with said wireless network; and a controller for controlling said subscriber unit and, responsive to said standard telephony device going off hook in order to make an outgoing call, for instructing said transceiver to establish a communication link and send a routing message which includes a predefined number for differentiating the subscriber unit from terminals which send complete directory numbers in a single message by identifying the subscriber unit as a remote wireless terminal which sends directory number or service activation codes digit by digit.

8. A subscriber unit as claimed in claim 7, wherein said wireless network uses an out of band signaling protocol for sending digit messages between said wireless terminals and said wireless network, wherein said subscriber unit further comprises:

a dialing detector for converting DTMF/loop disconnect dialing pulses dialed by said standard telephony device into digit messages according to the out of band signaling protocol of the wireless network.

9. A subscriber unit as claimed in claim 8 wherein said controller further comprises:

means for buffering any digit messages converted by said dialing detector from digits dialed prior to said radio link being established; and means for sending contents of the buffer to the transceiver once said radio link is established and for allowing any digit messages converted from digits dialed after said radio link is established to be sent to said transceiver upon conversion.

10. A subscriber unit as claimed in claim 8 wherein said subscriber unit further comprises means for muting any DTMF tones from being sent on the voice channel during call set up.

11. A subscriber unit as claimed in claim 7 further comprising indication means for providing audible indication to the user as to the status of the connection between the subscriber unit and the wireless network.

12. A subscriber unit as claimed in claim 11 wherein said indication means comprises means for providing locally simulated dial and re-order tones.

13. A subscriber unit as claimed in claim 11 wherein said indication means comprises:

means for passing network generated dial and re-order tones on the voice channel to the standard telephony device.

14. A method for using a wireless network for providing wireless telephony service to both a first set of remote terminals and a second set of remote terminals, said first set of remote terminals configured to originate calls by sending a call set up message including a dialed number (directory number or feature activation) upon establishing a wireless link with said wireless network and said second set of remote terminals configured to originate calls by sending a call set up message including a routing message, and then sending a dialed number on a digit by digit basis after establishing a wireless link with said wireless network, said method comprising:

(a) establishing a wireless link with a remote terminal which requests a link in order to set up a call;

(b) processing said call set up message, said processing step including the step of determining whether said call set up message includes said routing message;

(c) responsive to said determining step identifying said routing message, collecting and analyzing the digits sent by said terminal on a digit by digit basis in order to determine the complete dialed number; and (d) processing the call using the dialed number determined by said collecting and analyzing step.

15. A method as claimed in claim 14, wherein said routing message includes a signal indicative of a terminal of said second set and wherein step (b) comprises the step of evaluating whether such a signal is present.

16. A method as claimed in claim 14, wherein said routing message includes an identification signal indicative of a which set said terminal belongs and step (b) comprises consulting a database in order to evaluate whether a received identification signal is indicative of a second set terminal.

17. A method as claimed in claim 14, wherein said routing message is a predetermined directory number sent by the terminal in the same manner as an actual directory number is sent by said first set terminals and wherein:

said wireless network processes directory numbers by performing directory number translations on said directory numbers by consulting a translation database, said translation database including an instruction to perform the collecting and analyzing step on subsequently received digits for said predetermined directory number; and wherein step (b) comprises the step of performing directory number translations on the predetermined directory number received from the terminal; and step (d) comprises the step of performing directory number translations on the dialed number determined by said collecting and analyzing step.

18. A digit collection and analysis system for use in a wireless network wherein remote terminals originate calls using either a first format or a second format, wherein for said first format, a remote terminal sends a set up message which includes a complete directory number or service feature activation code to said wireless network, and for said second format a remote terminal sends a routing message which indicates that the terminal is using said second format and then sends digit messages representing a directory number or service feature request on a digit by digit basis to said wireless network, and wherein said wireless network includes a call processing system for processing calls or feature activation codes upon receipt of a complete directory number or feature activation code, said digit collection and analysis system comprising:

a digit analyzer, responsive to said wireless network receiving a call which includes said routing message identifying the call as one following said second format, for collecting and analyzing digits sent on a digit by digit basis, in order to determine the complete directory number or service feature activation code sent by said remote terminal;

a signaling link responsive to said analyzer, for sending said complete directory number or service feature activation code to said call processing system for call processing.

19. A digit collection and analysis system as claimed in claim 18 wherein said wireless network includes an MSC, said MSC includes said call processing system, and wherein said digit collection and analysis system forms part of a peripheral unit coupled to said MSC in such a manner that said peripheral unit has associated with it a specified directory number and wherein said routing message includes said specified directory number.

20. A digit collection and analysis system as claimed in claim 19 wherein said digit collection and analysis system further comprises a DTMF detector for detecting DTMF tones and a voice coupling to said MSC capable of passing DTNF tones from said MSC to said DTMF detector, said DTNF detector coupled to said digit analyzer.

21. A digit collection and analysis system as claimed in claim 19 wherein said digit collection and analysis system further comprises audible indication means for providing a user with an audible indication as to the status of a call.

22. A fixed wireless subscriber unit which sends the digits of a directory number or a feature activation code on a digit by digit basis to a base station associated with said subscriber unit, said base station connected to the telephone network which provides telephony service to the subscriber unit, said unit comprising:

a transceiver;

a telephony interface for connecting to a standard telephony device; and a controller for controlling said subscriber unit and, responsive to said standard telephony device going off hook in order to make an outgoing call, for instructing said transceiver to establish a communication link to said base station and to send a routing message which includes a predefined number for differentiating the subscriber unit from terminals which send complete directory numbers in a single message to said base station which instructs said base station to establish a communication link to said telephone network capable of passing digits dialed by said telephony device to said telephone network as said digits are dialed.

23. A fixed wireless network designed to act as a wireless interface between subscriber units as claimed in claim 22 and the public switched network, said wireless network comprising:

a base station for establishing communication links with said subscriber units;

a base station controller for controlling said base station; said base station controller including means for establishing a communication link with said telephone network upon receipt of said message, and means for passing signals representing digits dialed by said subscriber received from said subscriber unit to said telephone network.

24. A fixed wireless network as claimed in claim 23, wherein said means for passing signals comprises a signal generator which converts out of band signals requesting the generation of DTMF sent by said subscriber unit into corresponding signals according to the signal protocol used for sending dialed digits to said telephone network.

25. A method within a switch of a wireless network for providing a requested service and for receiving control information from a wireless communication device, comprising the steps of:

receiving a plurality of digits transmitted on a digit-by-digit basis by the wireless communication device, which wireless communication device is coupled to a wireline telephonic device;

interpreting the plurality of digits according to a select protocol to determine a requested service wherein the select protocol is for transmitting, receiving and interpreting digits; and providing the requested service responsive to the informational content of the plurality of digits.

26. The method of claim 25 further comprising the step of receiving a setup message prior to receiving the plurality of digits and analyzing the setup message generated by the wireless communication device.

27. The method of claim 26 further comprising the step of selecting the protocol for interpreting the plurality of digits responsive to the setup message.

28. The telecommunications switch of claim 26 wherein said circuitry includes circuitry for interpreting feature requests and for providing requested features according the feature request represented by the digits stored within said digit collector and analyzer.

* * * * *